Figure 1:
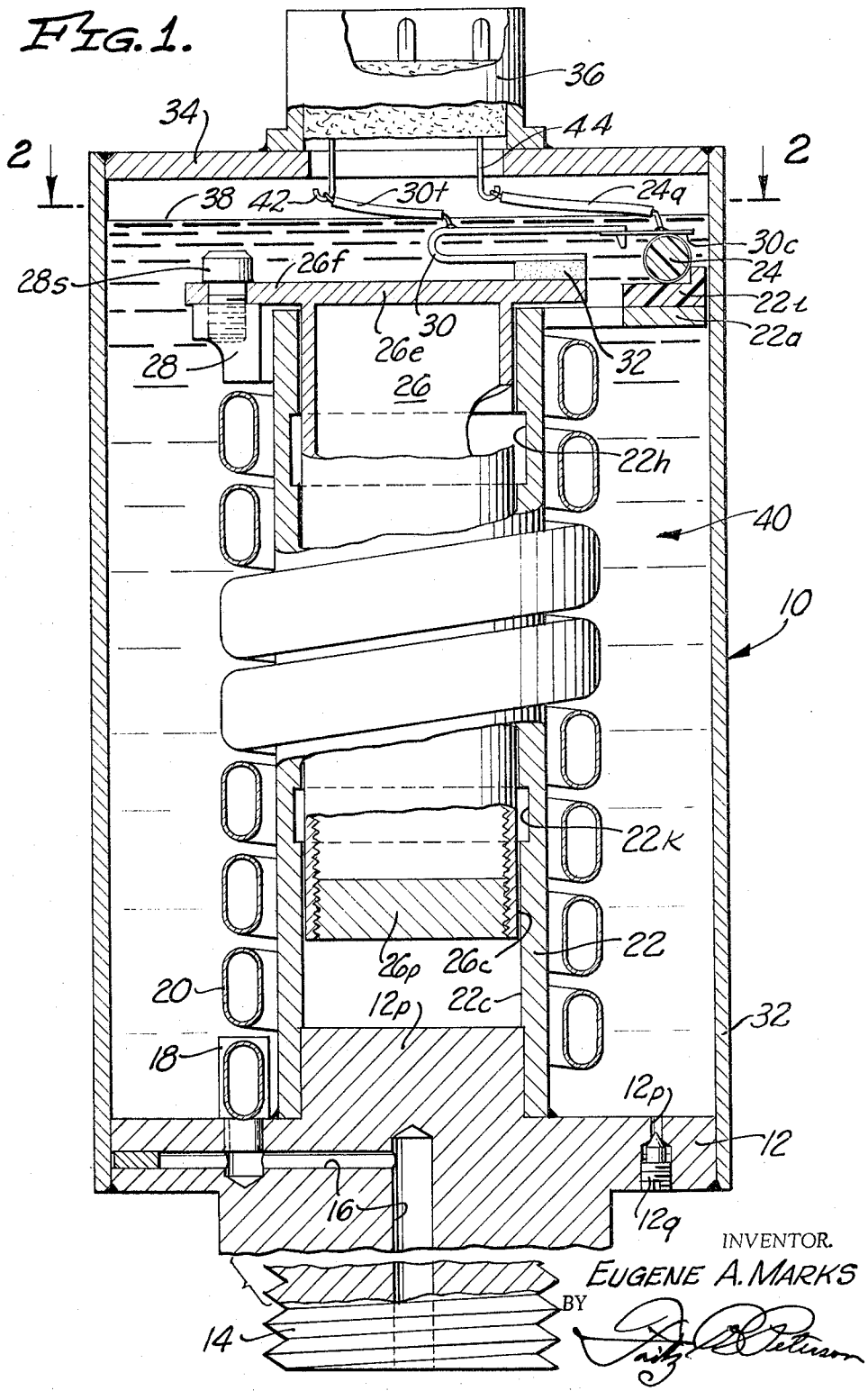

Aug. 23, 1966 E. A. MARKS 3,267,734
HELICAL BOURDON TUBE PRESSURE TRANSDUCER
Filed April 13, 1964 2 Sheets-Sheet 1

INVENTOR.
EUGENE A. MARKS
BY

Aug. 23, 1966  E. A. MARKS  3,267,734

HELICAL BOURDON TUBE PRESSURE TRANSDUCER

Filed April 13, 1964  2 Sheets-Sheet 2

INVENTOR.
EUGENE A. MARKS
BY

United States Patent Office 3,267,734
Patented August 23, 1966

3,267,734
HELICAL BOURDON TUBE PRESSURE
TRANSDUCER
Eugene A. Marks, Riverside, Calif., assignor to
Bourns, Inc., a corporation of California
Filed Apr. 13, 1964, Ser. No. 359,241
11 Claims. (Cl. 73—414)

The invention hereinafter disclosed pertains to pressure transducers of the helical Bourdon type such as a high pressure potentiometer having a helical Bourdon tube as the pressure-sensitive cell or component. More particularly the invention relates to a helical Bourdon tube pressure potentiometer adapted for operation with very low error during and following periods of extremely high acceleration and vibration.

It is known in the prior art instruments of the helical Bourdon tube type, to support for restricted rotation the free end of the Bourdon tube, to which free end one of the potentiometer or electrical indicating elements is attached. Thereby the free or movable end of the Bourdon tube is restrained against excessive lateral deflection as a column, and the accuracy of the indications is made acceptable even when the instrument is subjected to ordinary vibration. An example of such prior-art helical Bourdon tube pressure transducers is disclosed in U.S. Patent 1,852,982. However, there is a need in the art for a high-pressure transducer capable, without auxiliary apparatus, of producing accurate representations of pressure differences when the transducer is subjected to accelerations of the order of hundreds of times that of gravity ($g$). When subjected to acceleration of the order of one hundred $g$, the prior art helical Bourdon tube pressure potentiometers having bearing support for the free end of the tube suffered bearing breakdown or failure, jamming or locking, and the like. Helical Bourdon tube transducers lacking the bearing support for the free end of the tube suffered complete failure under much lower accelerations.

The present invention overcomes the noted difficulties and provides a helical Bourdon tube pressure potentiometer that easily operates accurately and without damage, while being subjected to accelerations of the order of hundreds of $g$. Further, the helical Bourdon tube pressure transducer provided by the invention is of simple construction and is inexpensive. The novel advantages and improvements presented by the invention are attained in part by securing the free end of the Bourdon tube to one end of a rotatable cylinder that is concentric with a second, fixed, cylinder that has an extensive surface close to but separated by a very small distance from the movable cylinder. Also the noted advantages are attained in part by disposing the convolutions or turns of the helical tube in a dense fluid of density such that the tube (and the fluid therein) is as a unit substantially "weightless," that is, is buoyed in the fluid by a force substantially equal to the mass of the unit. Also the noted advantages are attained in part by so devising the rotatable cylinder that it is, like the Bourdon tube and attaching means, of mass substantially equal to the buoyant force provided by immersion in the dense fluid. The fluid thus provided in which the movable portions of the instrument are substantially immersed, is contained in a container or housing in which the instrument is enclosed for protection. The fluid used, in the form of a high-density liquid, serves as a lubricant and damping means between the closely-adjacent relatively-movable surfaces of the cylindrical members. Examples of such "high-density" liquids are polybromotrifluoroethylene and blends thereof with other hydrocarbons such as polychlorotrifluoroethylene, all commercially available in the scientific specialties market.

The preceding general and brief description of the invention makes it evident that one object of the invention is to provide general improvements in transducers of the helical Bourdon tube type.

Another object of the invention is to provide a helical Bourdon tube transducer capable of successful operation under conditions incident to acceleration in excess of one hundred $g$.

An additional object of the invention is to provide a helical Bourdon tube pressure transducer characterized by exceptionally meritorious damping of the moving parts.

Another object of the invention is to provide a helical Bourdon tube pressure potentiometer in which friction error is reduced to a substantially insignificant value.

Figure 2:
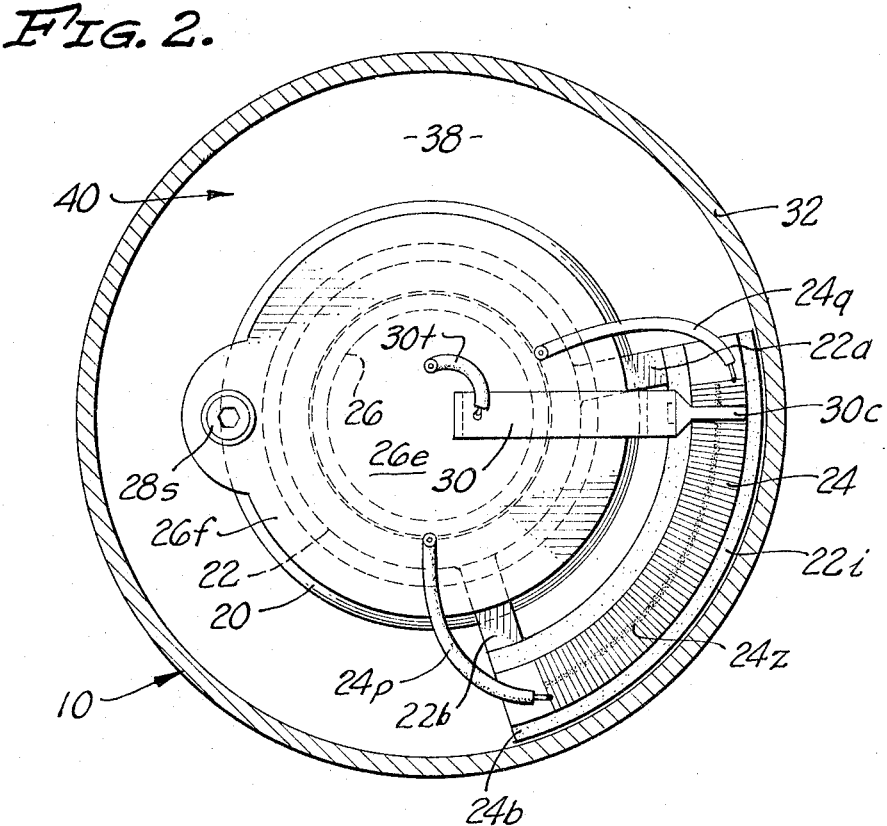

Other objects and advantages will be defined in the appended claims or made evident in the following detailed description of a preferred and exemplary physical instrument embodying the principles and concepts of the invention, the description containing references to the accompanying drawings illustrating the noted exemplary instrument and in which drawings:

FIGURE 1 is a view, partly sectional and partly diagrammatic, with portions broken away to facilitate illustration, of the exemplary instrument according to the invention; and FIGURE 2 is a view of the exemplary instrument in transverse section, the section having been taken on a plane and in the direction indicated by the broken line 2—2 of FIGURE 1.

In the drawing, the helical Bourdon tube pressure potentiometer is denoted generally by ordinal 10. The transducer comprises a base 12 formed integrally with a threaded pressure fitting 14 within which is formed a passage 16 by means of intersecting bores. The outer end of the transverse bore is plugged or sealed as indicated. Sealed to base 12 is a bored anchor 18 to which the lower and fixed end of the helical Bourdon tube 20 is brazed. The bore or passage in the anchor 18 is arranged to be in communication with both passage 16 and the interior of the Bourdon tube; hence fluid under pressure may be admitted to or exhausted from the Bourdon tube by way of the pressure fitting 14. The thus-far specifically numbered structure may be substantially the same as in previously known pressure potentiometers.

In accord with the present invention there are provided a fixed cylinder forming a support and bearing element and a coacting concentric movable cylinder to which the free end of the Bourdon tube is secured. Thus, in the exemplary embodiment of apparatus according to the invention base 12 is provided with a cylindrical pedestal 12p to which a cylindrical support 22 is firmly secured, as by welding or brazing. Support 22 is provided at its upper end with a pair of radially-extending arms 22a, 22b (FIGURE 2), upon the outer ends of which is secured an arcuate formed block of insulation 22i. Insulation 22i in turn supports thereon an arcuate resistance element 24 which in the exemplary device is an arcuate insulated wire bearing a winding of resistance wire. The resistance wire has brazed to end portions thereof respective insulated terminal leads 24p and 24q. The insulation 22i may be secured to arms 22a and 22b by adhesive, and similarly, element 24 may be secured to the insulation by means of adhesive. Thus the resistance element portion of the potentiometer is held stationary with respect to base 12, and it is provided with an exposed arcuate contact zone that is disposed in a plane at right angles to the axis of the support.

The stationary cylinder of support 22 provides a cylindrical bearing and damping surface (in the illustrated exemplary instrument the inner surface of the cylinder) which rotatably receives with very close clearance a complementary coaxial cylindrical bearing and damping surface of a movable cylinder 26. Cylinder 26 has an upper plate like end 26e that provides a radially-extending flange 26f to the bottom surface of which the upper end-block 28 of the Bourdon tube is secured as by means of a screw 28s. The upper end of the Bourdon tube is not only firmly secured to block 28 as by brazing or welding, but is sealed against passage of fluid by plugging or the like. Thus it is evident that the upper end of the Bourdon tube is restrained against radial movements but is free to rotate by rotating cylinder 26.

The arcuate rotational movements of movable cylinder 26, representing changes in the pressure differential between the interior and the ambient exterior of the Bourdon tube, are translated into representative exhibitions or changes of electrical resistance or potential difference by a wiper contact 30c that partakes of those rotational movements and brushes on the exposed arcuate contact zone 24z of the resistance element. Contact 30c is provided as a pellet of precious metal or alloy brazed to a resilient conductive wiper arm 30 that is secured to an insulative block 32 that in turn is firmly secured to flange 26f of cylinder 26 as indicated in FIGURE 1. Conventional fastening means, such as adhesives, or screws, or both, are used to secure members 30, 32, and 26f together. Wiper arm 30 is provided with a flexible terminal lead 30t as indicated.

According to the invention the Bourdon tube is substantially immersed in a liquid, and to that end, among others, base 12 has sealed therto around the outer periphery thereof the lower end of a cylindrical cover member 32 to which is sealed around its periphery at the upper end a cap 34. The cap has sealed thereto around a central opening, as by welding, an electrical connector 36 of the sealed or potted type. Thus there is provided a fluid-tight housing or enclosure in which the operating parts of the transducer are contained with a specially selected liquid 38 in which the noted patrs are immersed. The liquid may be introduced into the instrument in any of various ways; for example through a filler port 12p that is closed and sealed by a plug 12q. Further in accord with the invention the liquid 38 performs a plurality of functions, namely: (a) as a lubricant, (b) as a damping medium, and (c) as a means for rendering the moving parts almost completely insensitive to accelerations. As is evident, function (a) is preformed by the liquid coming between all closely-adjacent relatively-moving surfaces, and especially between the closely-adjacent surfaces 22c and 26c of cylinders 22 and 26, respectively. Function (b) is performed by surface contact with moving surfaces of the parts, and especially by that portion of the liquid that is confined between the closely adjacent surfaces 22c and 26c. Also, any vertical movement of the free end of the Bourdon tube, and movable cylinder 26, is damped by the thin cylindrical films of liquid between the cylinders, and by the obvious dash-pot effect of the liquid in the lower end of support 22. The magnitude of the damping effect, for a liquid of a selected or specific viscosity, may be regulated within limits by the provision of one or more annular grooves of experimentally derived length and depth, formed in one of the mating cylindrical surfaces. For example, in the illustrated embodiment, upper and lower annular grooves 22h and 22k are provided along the inner cylindrical wall or surface of support 22. As is evident, viscosity of the selected liquid will in considerable measure dictate the dimensions of the annular grooves. Also the actual dimensional clearance between the cylindrical surfaces 22c and 26c is dependent upon, among other things, the materials of which the cylinders are made, the temperature range throughout which the instrument must be capable of satisfactorily operating, the lubricity of the liquid, and the accuracy tolerances to which the machining operations are expected to be performed. Thus the dimensions, not critical for reasons presently explained, may be arrived at for instruments for various pressure ranges, by well known design procedures.

The third and most important function, (c), of liquid 38, is to so effectively buoy the Bourdon tube and the movable parts connected therewith as to render them in effect substantially weightless in the liquid, whereby when the instrument is subjected to extremely high accelerations there is substantially no tendency for the movable parts to change position. The liquid 38 is made to nearly fill the enclosed chamber 40 in which the movable parts are housed, whereby irrespective of the direction of the acceleration to which the instrument is subjected the movable parts remain immersed. Since not only the movable portions of the Bourdon tube, but also the movable cylinder 26 and its attachments must be thus buoyed by a force substantially equal to the apparent weight of those parts, the movable cylinder is made to form a closed fluid-tight hollow body. To the latter end, the lower end of cylinder 26 is closed by a plug 26p that is sealed in place in the end of the cylinder. As is evident, the mass and the displaced volume of the cylinder and attachments may be regulated by selection of the size and density of the plug 26p. Similarly, for liquid of a particular density, the cross-sectional configuration of the Bourdon tube may be made such that the proper degree of buoyancy is attained. As is evident, for a thick-walled high-pressure tube of stainless steel the tube configuration will vary from that of a lower-pressure tube of other material.

Typical dense liquids that may be utilized in the instrument include such commercially available fluids as polybromotrifluoroethylene and blends thereof with other hydrocarbons such as polychlorotrifluoroethylene.

The aforementioned electrical terminal leads 30t, 24p and 24q extend to and are soldered or otherwise conductively secured at their other ends to respective ones of sealed lead-through conductors, such as 42 and 44 (FIGURE 1), comprised in the sealed connector 36.

The foregoing description and explanation of a preferred form of physical instrument embodying the principles of the invention make it evident that due to immersion of the moving portions of the operating parts of the instrument in a high-density liquid and so proportioning and selecting the shapes, sizes and materials of the parts that the movable parts are substantially weightless in the liquid, the instrument can be subjected to extremely high accelerations without adverse or destructive deformation of those parts, while at the same time excellent damping and substantially frictionless bearing means are provided for the movable support for the free end of the Bourdon tube, all concurrently with provision of an instrument that is at once easily and inexpensively produced.

The foregoing disclosure indicates full achievement of the stated objectives of the invention. In the light of the disclosure of only a preferred exemplary embodiment, changes and modifications within the true spirit and scope of the invention will occur to others and hence it is not desired to restrict the invention to the specific illustrated structure except as may be required by limitations contained in the appended claims.

I claim:
1. A helical Bourdon tube pressure transducer comprising:
- first means, including rigid means forming a sealed fluid-tight enclosure for enclosing operating members of the transducer, said first means including stationary structure providing an anchor for anchoring a fixed end of a helical Bourdon tube and for admitting fluid under pressure to such tube; said first means further including means providing an elongate stationary support presenting a first cylindrical surface;
- second means, including a helical Bourdon tube disposed in said enclosure encircling said support and having a fixed end sealed to said anchor and having a sealed second end subject to movement relative to the fixed end incident to change of pressure exhibited by fluid in the interior of the tube;
- third means, including an elongate movable hollow sealed member having an extensive second cylindrical surface very closely adjacent to and concentric with said first cylindrical surface and forming with said stationary support a bearing for said movable member, and said member being connected to the second end of said Bourdon tube to restrict the movements of the latter;
- fourth means, including relatively movable means connected in part to said first means and in part to said second means, functioning to indicate changes in pressure exhibited by the fluid in said Bourdon tube; and
- fifth means, including a dense liquid in said enclosure and surrounding said third means and in contact with the movable part of said Bourdon tube, said liquid serving to render substantially weightless therein said movable hollow sealed member and said Bourdon tube and serving to lubricate said bearing,
- whereby said transducer may be subjected to accelerations in excess of one hundred times that of gravity without structural damage thereto.

2. A pressure transducer according to claim 1, in which said fourth means comprises a potentiometer resistance element supported by said first means and an insulated wiper and contact supported by said movable hollow sealed member and rotatable therewith to brush said resistance element, and terminal connections to said contact and end portions of said resistance element, extending to the exterior of said enclosure.

3. A pressure transducer according to claim 1, in which said first means comprises a base and in which said elongate support is a tubular cylinder upstanding from said base at one end and is encircled by said Bourdon tube and is provided with a cylindrical inner surface closely encircling the said cylindrical surface of said movable hollow sealed member.

4. A pressure transducer according to claim 3, in which a selected one of said elongate stationary support and said elongate movable hollow sealed member is provided with an annular groove to reduce the extent of the cylindrical surface thereof in close adjacency to the cylindrical surface of the other one thereof to provide for reduction of the damping of relative movement thereof.

5. A pressure transducer according to claim 3, in which said movable hollow sealed member is a hollow cylinder having a radially outwardly extending flange and means connecting said second end of said Bourdon tube to said flange.

6. A pressure transducer according to claim 5, in which said fourth means includes an insulated wiper arm and contact mounted on the said flange of said movable member, and an arcuate potentiometer resistance element mounted on said first means in position to be brushed by said contact incident to rotation of said hollow cylinder in response to change in pressure exhibited by the fluid in said Bourdon tube.

7. A helical Bourdon tube pressure transducer comprising:
- first means, including a base and means secured thereto forming an enclosure;
- second means, including a helical Bourdon tube having a first fixed end and a second sealed end and affixed at said first end to said base, and including means for admitting fluid under pressure to the interior of the tube via said first end;
- third means, including movable hollow sealed means having a surface closely adjacent a complementary surface of said first means whereby the latter restricts movements of said hollow sealed means, said hollow sealed means restraining said second end of said Bourdon tube to motion in a prescribed path;
- fourth means, including fixed means affixed to said first means, and cooperative other movable means connected to said second means and moved thereby, to furnish indications of movements of said second end of said Bourdon tube indicative of pressure exhibited therein; and
- fifth means, including a liquid of density in excess of 1.5, contained in said enclosure and in which said second and third means are immersed, said liquid being of density such as to render said Bourdon tube and said movable hollow sealed means substantially weightless therein,
- whereby incident to high acceleration of said instrument said Bourdon tube is not disruptively deformed.

8. A helical Bourdon tube pressure transducer according to claim 7, in which said first means includes a support upstanding from said base having an elongated cylindrical surface encircled by said Bourdon tube, and said movable hollow sealed means comprises a movable member having a cylindrical surface coaxial with and closely spaced radially from said elongate cylindrical surface to provide a cylindrical bearing therewith for rotational restraint of the movable member, said movable member being secured to the said second end of the Bourdon tube to rotate therewith, and in which said liquid serves to lubricate said cylindrical bearing and to buoy said movable member with a force at least approximately equal to the weight of the movable member.

9. A pressure transducer according to claim 8, in which said fixed means and said cooperative other movable means of said fourth comprises a potentiometer having a movable part attached to said movable hollow member to rotate with the latter.

10. A helical Bourdon tube pressure transducer comprising:
- first means, including means providing a fluid-tight enclosure for enclosing operating components of the transducer, said first means including structure providing for anchorage of a fixed end of a Bourdon tube and providing for admission of fluid to and from the Bourdon tube, said first means providing a support fixed relative thereto and having an elongate cylindrical surface disposed about a longitudinal axis;
- second means, including a helical Bourdon tube disposed in said enclosure and encircling said longitudinal axis, said Bourdon tube having a fixed end secured to said structure at said anchorage and having a free end movable in response to changes in the difference of the pressures exhibited at the inside and at the outside thereof, respectively;
- third means, including rotatable means comprising a hollow member having an adjustable plug for adjusting the immersible volume thereof, said rotatable means having an elongate cylindrical surface disposed in close adjacency and concentric generally coaxial relationship to said first-named cylindrical surface for rotational bearing relationship therewith;
- fourth means, including a dense liquid in said enclosure in immersing relationship with said Bourdon tube and said third means, said liquid serving to render substantially weightless therein said Bourdon tube; and
fifth means, including means connected in part to said first means and in part to a selected one of said second and third means, for producing electrical indications of relative motion therebetween incident to changes in the difference of the pressures exhibited at the inside and at the outside of said tube,
whereby said transducer is effective to withstand accelerations in excess of one hundred times that of gravity without structural damage.

11. A helical Bourdon tube pressure transducer substantially according to claim 10, in which said rotatable member is a hollow cylinder.

References Cited by the Examiner
UNITED STATES PATENTS

| | | | |
|---|---|---|---|
| 2,623,083 | 12/1952 | Schlumber et al. | 73—432 |
| 3,145,359 | 8/1964 | Parkinson | 73—398 |

LOUIS R. PRINCE, *Primary Examiner.*

D. O. WOODIEL, *Assistant Examiner.*